May 9, 1939.  G. W. ASHLOCK, JR  2,157,518
FRUIT PITTER
Filed Jan. 8, 1938   3 Sheets-Sheet 1
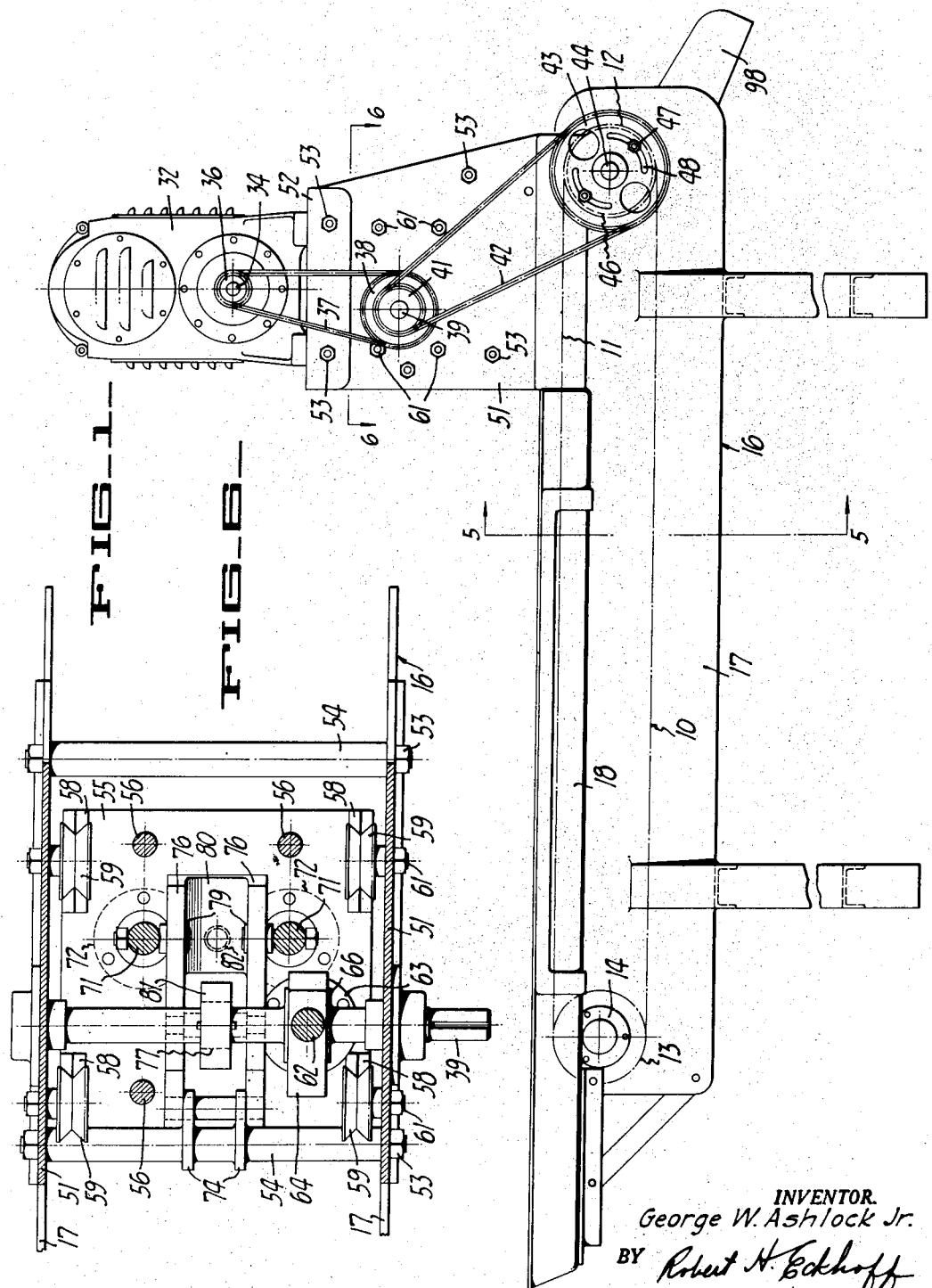
INVENTOR.
George W. Ashlock Jr.
BY Robert H. Eckhoff
ATTORNEY May 9, 1939.　　　　G. W. ASHLOCK, JR　　　　2,157,518
FRUIT PITTER
Filed Jan. 8, 1938　　　　3 Sheets-Sheet 2
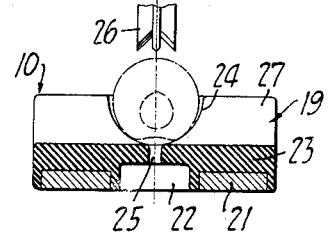
FIG_3_
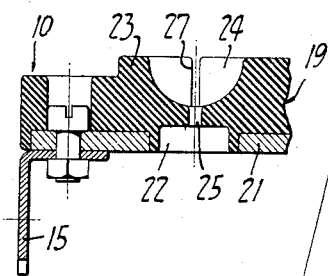
FIG_4_
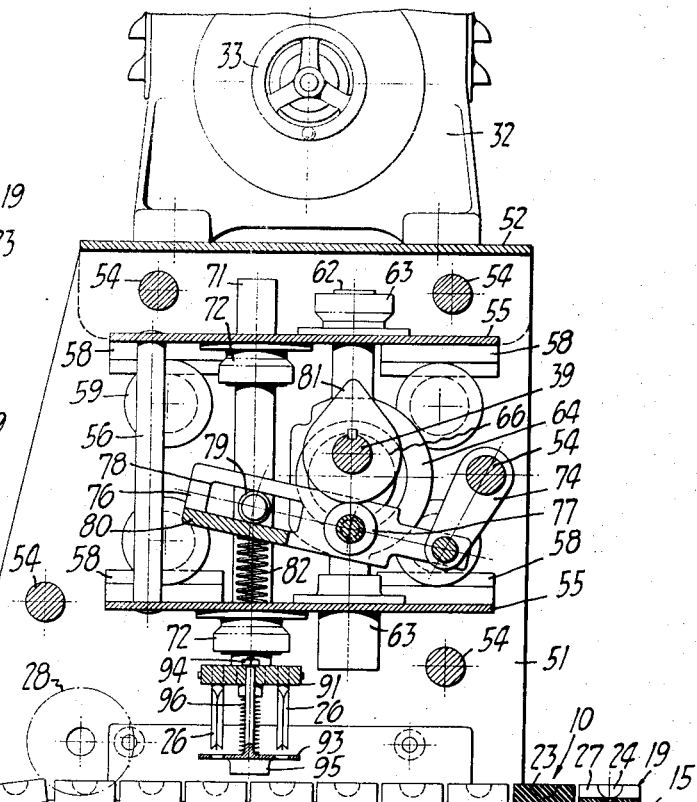
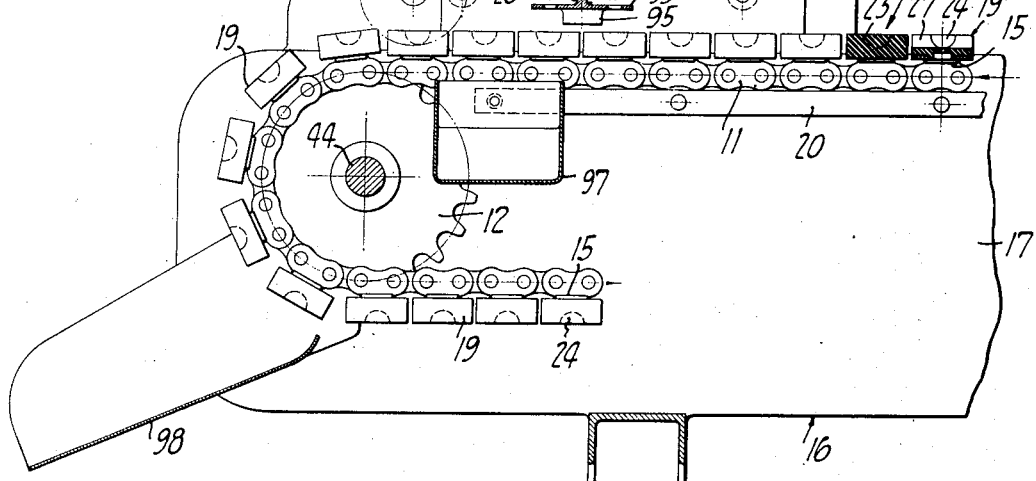
FIG_2_
INVENTOR.
George W. Ashlock Jr.
BY Robert H. Eckhoff
ATTORNEY May 9, 1939.  G. W. ASHLOCK, JR  2,157,518
FRUIT PITTER
Filed Jan. 8, 1938  3 Sheets-Sheet 3
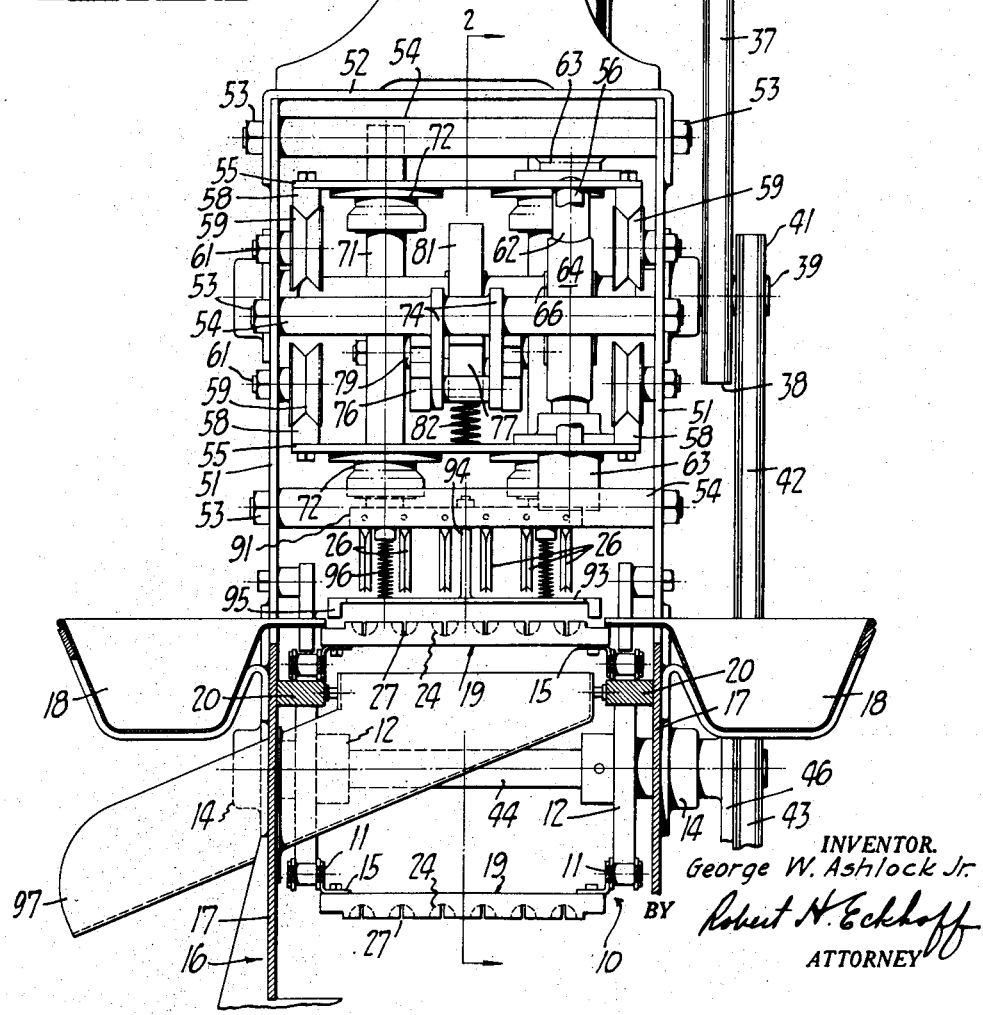
INVENTOR.
George W. Ashlock Jr.
BY Robert N. Eckhoff
ATTORNEY Patented May 9, 1939

2,157,518

UNITED STATES PATENT OFFICE 2,157,518

FRUIT PITTER

George W. Ashlock, Jr., Oakland, Calif.

Application January 8, 1938, Serial No. 184,007

4 Claims. (Cl. 146—19)

This invention relates to a fruit pitting mechanism and particularly to a mechanism for pitting cherries. While the machine will be particularly described as it has been applied to the pitting of cherries, it will be obvious that by changing the proportions the same mechanism can be used with other fruits, for example, apricots and olives.

The present machine is one in which the fruit carriers are continuously advanced, the machine being of that general type disclosed in the Conner et al. Patent No. 2,092,956, patented September 14, 1937.

Previous fruit pitting machines, even of the power type, have been relatively slow in operation. Although the fruit carriers were advanced continuously, the pitting mechanism was so constructed that a relatively heavy part had to be reciprocated or oscillated. Furthermore, the power operated mechanism was of such a nature and was so provided heretofore that only a single row of fruit could be pitted at one time. The machine of the present invention obviates this difficulty, enabling a plurality of successive carriers to be pitted at the same time. In addition, the present machine is so simply constructed that its pitting operation can be conducted at a speed equal to and in excess of that at which the fastest trained operator can feed fruit. In other words, the pitting machine of my invention can be adjusted to pit the fruit as fast as it can be delivered by any present known means.

It is in general the broad object of the present invention to provide a simple and yet exceedingly fast fruit pitting machine of the continuous carrier type.

Another object of the invention is to provide a novel and simple pitting mechanism.

Another object of the invention is to provide a novel form of carrier for the fruit.

The invention has additional objects and features of advantage, some of which, together with the foregoing, will appear in the following description of one embodiment of the machine of my invention. It will be understood that the form of apparatus disclosed is only the present preferred embodiment, and various other embodiments may be adopted, within the scope of the appended claims.

Referring to the drawings, Figure 1 is a side elevation of the machine embodying the present invention.

Figure 2 is an enlarged side elevation of the pitting mechanism and the carrier mechanism, the view being partly in section.

Figure 3 is an enlarged sectional view showing the relation between the carrier, the fruit and the pitting mechanism.

Figure 4 is an enlarged sectional view showing the attachment of one of the fruit carriers to a conveyor.

Figure 5 is a section taken along the line 5—5 in Figure 1, while Figure 6 is a section taken along the line 6—6 in Figure 1.

The machine of the present invention includes a carrier structure generally indicated at 10. This carrier structure comprises opposite chains 11 made up of a plurality of links, the chains being extended about spaced sprockets 12 and 13 mounted in suitable journals 14 at opposite ends of a suitable frame indicated generally at 16. Suitable guard plates 17, and troughs 18, for the protection and conveinence of the operators, are provided.

The carrier structure, as has been previously set forth, includes a plurality of chain links, each providing a continuous chain 11 movable about sprockets 12 and 13. Each chain link includes an angle member 15 secured thereto and movable therewith. To each angle member is attached a fruit carrier, generally indicated at 19. Support members 20 are secured upon the frame below the chains to support the upper horizontal run of the chains whereby the carriers provide a suitable surface.

Each fruit carrier 19 is made up of a metal plate 21 having a plurality of apertures 22 therein. A layer of heavy rubber 23 is secured to the metal plate, the rubber being bonded to the metal in a manner well known in the art. Each plate includes a plurality of fruit receptacles 24 in which the fruit can be positioned, as appears in Figure 3, with the stem end of the fruit down and adjacent to passage 25 in the rubber support. When a pitting mechanism, indicated by knife 26 in Figure 3, is lowered to engage the fruit, it cuts the fruit and forces the pit out through the stem end of the fruit, through passage 25. Each receptacle is preferably slotted as at 27 to permit of the use of saws indicated at 28 (Figure 2) for cutting the fruit in halves, if this is desired.

In the drawings I have shown in Figure 5 the fruit carrier 19 as including six receptacles. A greater or lesser number than this can be employed, depending upon the desire of the fruit packer. The carrier structure is not claimed herein, but is claimed in a co-pending application.

Means are provided to permit the rate of advance of the fruit to be readily adjusted. An electric motor 31 is provided to supply power, the motor driving a variable speed drive indicated generally at 32. The speed of this drive is adjustable by means of adjusting wheel 33. Various speed change mechanisms of an adjustable character are known and that depicted is the one sold by U. S. Electric Motors of Los Angeles, California, as its "Varidrive". The speed change mechanism includes a power output shaft 34 carrying a sprocket 36. This is connected by a chain 37 to a sprocket 38 on a shaft 39. Another sprocket 41 is carried on shaft 39 and from this chain 42 extends to a sprocket 43 on shaft 44, the shaft carrying sprockets 12. The relation of sprocket 43 to shaft 44 can be adjusted so that the timing of the carrier relative to operation of the pitting mechanism can be adjusted. This is achieved by having sprocket 43 connected to shaft 44 through plate 46 which is keyed to the shaft. Bolts 47 and slots 48 permit of movement between the plate and sprocket.

In accordance with this invention a relatively simple and light pitting operating mechanism is provided. The frame 16 includes opposite parallel vertically extending side members 51 supported on the frame 16 and joined together by member 52 and bolts 53 at the ends of spacers 54 to provide a support for the pitting operating mechanism and for the motor 31 and drive 32. Between the side plates 51 is a head structure which includes horizontal parallel plates 55, secured together in a spaced parallel relation as by spacers 56. Each plate carries a plurality of V blocks 58 engaged with V rollers 59 mounted upon studs 61 in each side member. The V blocks and V rollers support the head structure provided by plates 55 for a sliding reciprocating movement between the side members.

Means are provided for reciprocating the head structure provided by plates 55. This means includes a vertical shaft 62 slidably journaled in suitable bearings 63 in the plates 55. Mounted upon this shaft and carried thereby is an eccentric follower 64 within which is an eccentric 66 rotated by shaft 39. Upon rotation of shaft 39, eccentric 66 is effective to reciprocate the head structure provided by plates 55 in a plane parallel to the carrier passing beneath the head structure. The character of the eccentric is such that during a portion of the reciprocatory movement of the head structure, and at least during that portion of the advance movement of the head structure parallel to and in the same direction as the fruit carriers, the head structure moves at the same rate as do the carriers passing beneath.

Means are provided in the head structure for operating the pitting mechanism. This means includes two plungers 71 suitably journaled in bearings 72 on plates 55. Mounted upon one of the bolts 54 are fixed arms 74 which extend to provide a support for spaced levers 76. Between the levers 76 is mounted a cam follower 77. The extending end of each lever 76 is slotted as at 78 to engage a roller 79 carried upon each plunger 71. Cam follower 77 is maintained in engagement with a cam 81 carried on shaft 39, spring 82 engages pad 80, which joins the levers 76, the spring urging levers 76 clockwise in Figure 2 so that the cam follower engages the cam at all times.

The shape and timing of cam 81 is such that plungers 71 are only forced down when the head structure is moving at the same rate of advance as is the carrier, so that no relative motion, in a horizontal direction, is present between the plungers and the fruit positioned on the carriers.

The plungers enter, pit and leave the fruit without any tendency to rotate the fruit.

Extended between the plungers is a plate 91 carrying a plurality of pitting mechanisms typically shown as the star-shaped knives 26. These knives are arranged in rows across the plate 91 so that a plurality of successive carriers are pitted at one time. In the drawings I have only shown two rows, but more can be provided if desired:—three, four or five rows. In this case, it is only necessary to provide the additional mechanisms, change eccentric 66 and cam 81 to secure proper timing.

To facilitate operation, a cleaning plate 93 is yieldably secured to plate 91 by bolt 94, springs 96 urging the plate 93 away from the plate 91. The pitting knives are advanced through suitable apertures in the cleaing plate 93 to engage fruit upon the carriers beneath, extensions 95 on plate 93 engaging the carriers and moving with them. When the fruit has been pitted, the pits being forced through apertures 25 and 22 in the carriers, the knives are withdrawn, being cleaned by the plate 93 as they return. The ejected pits are forced into a trough 97 for removal while the pitted fruit is carried on and is dropped out of the fruit carriers as they turn over sprockets 12 and return to the under side of the machine, the food dropping into a suitable trough 98.

In practice I have found that the present machine will pit fruit as fast as it can be placed upon the carriers in position. The variable speed drive mechanism enables the rate of operation of both the carrier and the pitting mechanism to be adjusted to suit the skill of the operators or the mechanism placing the fruit upon the carriers. However, while the mere provision of a variable speed drive in and of itself does not provide novelty, nevertheless, the prior art pitting mechanisms were not capable of the high speed of operation which the present machine has attained and which it has successfully maintained. The pitting head, in accordance with this invention, is relatively simple and light and its reciprocation and timing by relatively simple means offers little mechanical difficulty, at the same time providing great flexibility in operation. Thus, the present machine enables pie cherries to be pitted rapidly and satisfactorily. Pie cherries are merely pitted cherries, no attention being given to the position of the cherry when the pit is removed. They can be thrown by the bucketfull on the flat surface provided by the carriers and swept by hand or by brushes to ensure each receptacle is filled. Hundreds of cherries a minute can thus be pitted.

I claim:

1. A fruit pitting mechanism comprising a succession of carriers movable at a substantially constant rate of advance over a path including a substantially horizontal portion of substantial length, pitting mechanism mounted over said carriers adjacent an end of said horizontal portion and movable to engage and pit fruit on said carriers; and means for moving said pitting mechanism including a sliding reciprocating head movable back and forth above at least a portion of said horizontal portion over a path parallel to that of said carriers, means for advancing said head in a straight line in the direction of advance of said carriers at the same rate of advance over a portion of said path to maintain said pitting mechanism for a predetermined time interval superimposed over a carrier, and means for lowering said pitting mechanism during said interval to engage and pit fruit on said carrier and for raising said pitting mechanism from engagement with said fruit.

2. A fruit pitting mechanism comprising a succession of carriers movable at a substantially constant rate of advance over a path including a substantially horizontal portion of substantial length, pitting mechanism, a head structure, means mounting said pitting mechanism for a reciprocable vertical movement in said head, means supporting said head for reciprocation in a horizontal plane back and forth above at least a portion of said horizontal portion, a shaft, an eccentric on said shaft for advancing said head at a rate equal to the rate of advance of said carriers to maintain said pitting mechanism superimposed over a carrier upon rotation of said shaft, a cam on said shaft for forcing said pitting mechanism down to pit fruit on a carrier beneath the superimposed pitting mechanism.

3. In a machine of the character described, a pair of opposite side members extending vertically, a pair of horizontal spaced parallel plates, means joining said plates together to provide a unitary head structure, means supporting said head structure for sliding movement between said side members in a horizontal plane, a continuous fruit carrier movable over a path including a substantially horizontal portion extending between said side members and below said plates, means for advancing said carrier substantially continuously, a plunger movable up and down in said plates, pitting mechanism on said plunger effective to pit fruit on said carrier, an eccentric carried by said head structure, a shaft for rotating said eccentric to reciprocate said head, a cam on said shaft, a lever hinged at one end on said side members and slidably engaged with said plunger at the other end, and a cam follower carried by said lever in engagement with said cam.

4. In a machine of the character described, a pair of opposite side members extending vertically, a pair of horizontal spaced parallel plates, means joining said plates together to provide a unitary head structure, means supporting said head structure for sliding movement between said side members in a horizontal plane a continuous fruit carrier movable over a path including a substantially horizontal portion extending between said side members and below said plates, means for advancing said carrier substantially continuously, a plunger movable up and down in said plates, means biasing said plunger to move in one direction in said plates, pitting mechanism on said plunger effective to pit fruit on said carrier, an eccentric carried by said head structure, a shaft for rotating said eccentric to reciprocate said head, a cam on said shaft, a lever hinged at one end on said side members and slidably engaged with said plunger at the other end, and a cam follower carried by said lever in engagement with said cam.

GEORGE W. ASHLOCK, Jr.